United States Patent
Jablonski

(10) Patent No.: US 12,162,381 B2
(45) Date of Patent: Dec. 10, 2024

(54) VEHICLE SEAT TRACK POSITION SENSOR ASSEMBLY

(71) Applicant: CTS Corporation, Lisle, IL (US)

(72) Inventor: John Jablonski, Three Rivers, MI (US)

(73) Assignee: CTS Corporation, Lisle, IL (US)

( * ) Notice: Subject to any disclaimer, the term of this patent is extended or adjusted under 35 U.S.C. 154(b) by 225 days.

(21) Appl. No.: 17/806,992

(22) Filed: Jun. 15, 2022

(65) Prior Publication Data

US 2022/0396177 A1 Dec. 15, 2022

Related U.S. Application Data

(60) Provisional application No. 63/210,821, filed on Jun. 15, 2021.

(51) Int. Cl.
| | | |
|---|---|---|
| *B60N 2/02* | (2006.01) | |
| *B60N 2/00* | (2006.01) | |
| *B60R 21/015* | (2006.01) | |

(52) U.S. Cl.
CPC ............ *B60N 2/0244* (2013.01); *B60N 2/002* (2013.01); *B60N 2/0264* (2023.08); *B60N 2/0268* (2023.08); *B60R 21/01554* (2014.10)

(58) Field of Classification Search
CPC .. B60N 2/002; B60N 2/0244; B60N 2/02246; B60N 2/04–0893; B60R 21/01554; G01D 11/245; H01R 2201/04; H01R 2201/16; H01R 13/74–745

See application file for complete search history.

(56) References Cited

U.S. PATENT DOCUMENTS

| | | | | |
|---|---|---|---|---|
| 5,445,534 A | * | 8/1995 | Ishizuka | H01R 12/775 |
| | | | | 439/352 |
| 6,206,717 B1 | * | 3/2001 | Matsumoto | H01R 13/641 |
| | | | | 439/923 |
| 7,147,261 B2 | | 12/2006 | Ventura et al. | |
| 7,614,597 B2 | | 11/2009 | Matsumoto et al. | |
| 10,889,209 B2 | * | 1/2021 | Duriez | B60N 2/0881 |
| 2011/0254539 A1 | | 10/2011 | Saini et al. | |

FOREIGN PATENT DOCUMENTS

WO 2004028854 A2 4/2004

OTHER PUBLICATIONS

International Search Report and Written Opinion for Application No. PCT/US2022/072954 dated Sep. 13, 2022 (14 pages).

* cited by examiner

*Primary Examiner* — Syed A Islam
(74) *Attorney, Agent, or Firm* — Michael Best & Friedrich LLP

(57) ABSTRACT

A vehicle seat track position sensor assembly is adapted for mounting to a moveable vehicle seat track. The vehicle seat track position sensor assembly comprises a bracket including a plurality of walls defining a central bracket cavity and a plurality of teeth. A sensor body is seated in the central bracket cavity of the bracket and includes another plurality of teeth adapted for engagement with the plurality of teeth on the bracket for securing the sensor body to the bracket. The vehicle seat track position sensor assembly is adapted for mounting into the interior cavity of a moveable vehicle seat track. The plurality of teeth on the sensor body are adapted for advancement relative to and against the teeth of the bracket for locking the vehicle seat track position sensor assembly in the interior cavity of the vehicle seat track at a selected position.

19 Claims, 5 Drawing Sheets

VEHICLE SEAT TRACK POSITION SENSOR ASSEMBLY

RELATED APPLICATIONS

This application claims priority from U.S. Provisional application 63/210,821 filed Jun. 15, 2021, the disclosure of which is hereby incorporated by reference herein.

FIELD OF THE INVENTION

This arrangement relates to a vehicle seat track position sensor assembly with a combination seat track and position sensor bracket.

BACKGROUND OF THE INVENTION

Seat track position sensors can be adapted for mounting into the hollow interior cavity of a vehicle seat track.

Due to the variances in the dimensions and tolerances of the material of the vehicle seat tracks that occur as a result of the manufacturing and forming process and, more particularly, the variances in the dimensions and tolerances of the hollow interior cavity of the vehicle seat track as a result of the manufacturing and forming process, there is a need for a vehicle seat track position sensor assembly with a bracket that allows for a secure mounting to the vehicle seat track irrespective of the variations in the dimensions and tolerance of the material and interior cavity of the vehicle seat track.

The present arrangement is directed to a vehicle seat track position sensor with a bracket that meets this need.

SUMMARY OF THE INVENTION

The present arrangement is generally directed to a vehicle seat track position sensor assembly adapted for mounting to a vehicle seat track, the vehicle seat track position sensor assembly comprising a bracket including a plurality of walls defining an interior cavity and including a plurality of teeth, and a sensor body seated in the interior cavity of the bracket and including a plurality of teeth adapted for engagement with the plurality of teeth on the bracket for securing the sensor body to the bracket.

In one embodiment, the vehicle seat track defines an interior cavity and the vehicle seat track position sensor extends into the interior cavity of the vehicle seat track, the plurality of teeth on the bracket being adapted for advancement relative to and against the teeth of the bracket for locking the vehicle seat track position sensor assembly in the interior cavity of the vehicle seat track.

In one embodiment, respective locking tabs on the bracket extend into respective apertures in the vehicle seat track for securing the vehicle seat track position sensor assembly to the vehicle seat track.

In one embodiment, respective guide rails on one of the sensor body or the bracket are adapted for engagement with respective guide tracks on the other of the sensor body or the bracket for securing the sensor body to the bracket.

In one embodiment, respective flanges at opposed distal ends of the sensor body are adapted for engagement with respective walls on the vehicle seat track for positioning and securing the vehicle seat track position sensor assembly in the interior cavity of the seat track.

In one embodiment, crush ribs on the respective locking tabs are adapted for engagement with respective apertures on the vehicle seat track.

In one embodiment, a fin on the sensor body or the bracket is adapted for engagement with a slot in the vehicle seat track for securing the vehicle seat track position sensor assembly to the vehicle seat track.

In another embodiment, a method of mounting a vehicle seat track position sensor assembly to a vehicle seat track comprises providing the vehicle seat track position sensor assembly adapted for mounting to a vehicle seat track, the vehicle seat track position sensor assembly. The vehicle seat track position sensor assembly includes: a bracket including a plurality of walls defining a central bracket cavity with a plurality of teeth projecting into the central bracket cavity, the bracket including flanges having respective tabs projecting inwardly therefrom; and a sensor body seated in the central bracket cavity of the bracket and including another plurality of teeth adapted for engagement with the plurality of teeth on the bracket for securing the sensor body to the bracket. The method includes providing a movable vehicle seat track having a front opening and a pair of spaced apertures on opposing sides thereof; and inserting a distal end of the vehicle seat track position sensor assembly into the front opening of the movable vehicle seat track until the respective tabs projecting from the flanges enter the spaced apertures of the movable vehicle seat track for securement thereto.

Other advantages and features of the present arrangement will be more readily apparent from the following detailed description of the embodiments, the accompanying drawings, and the appended claims.

BRIEF DESCRIPTION OF THE DRAWINGS

These and other features of the embodiments can best be understood by the description of the accompanying FIGS. as follows.

DESCRIPTION OF THE EMBODIMENTS

Figure 1:
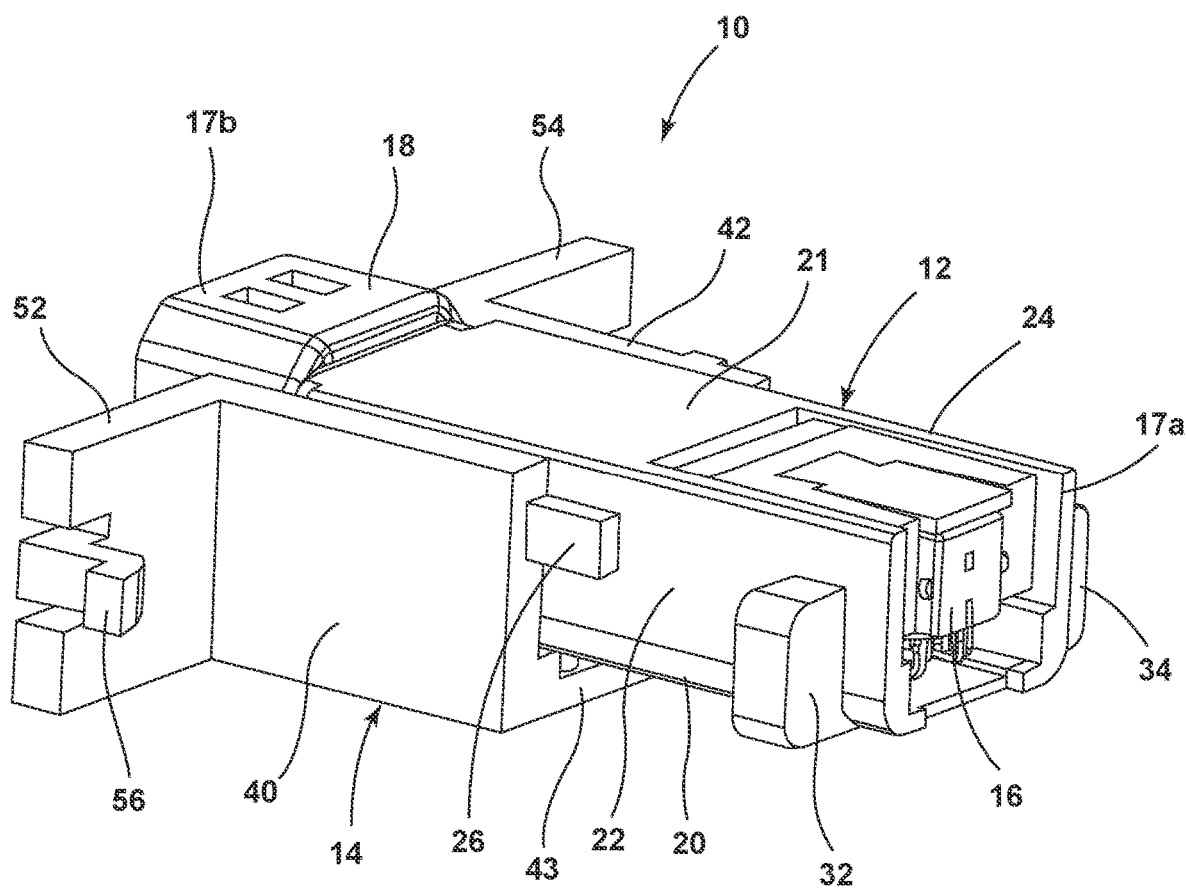
FIG. 1 is a perspective view of a vehicle seat track position sensor assembly in accordance with one embodiment.
Figure 2:
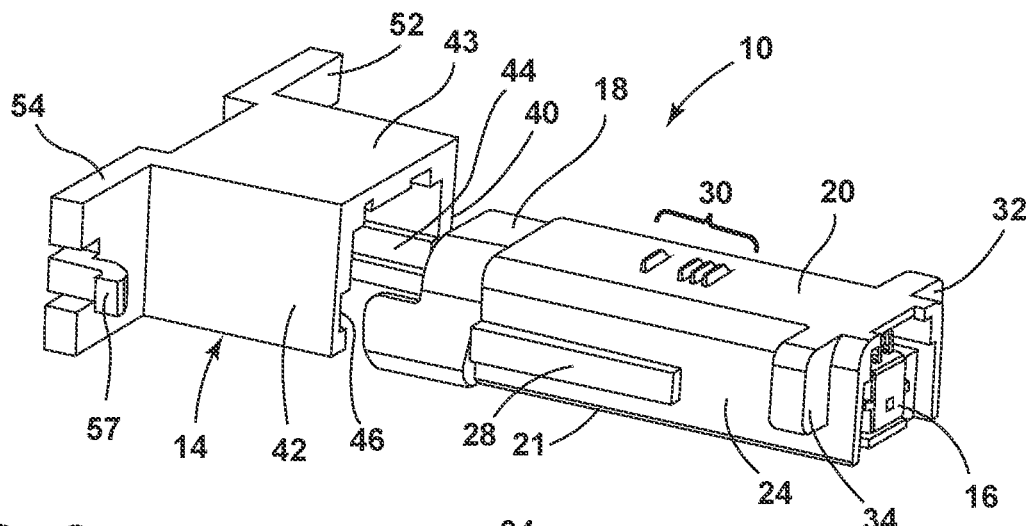
FIG. 2 is a perspective view of the vehicle seat track position sensor assembly of FIG. 1 which depicts the sensor body separated from the sensor bracket.
Figure 3:
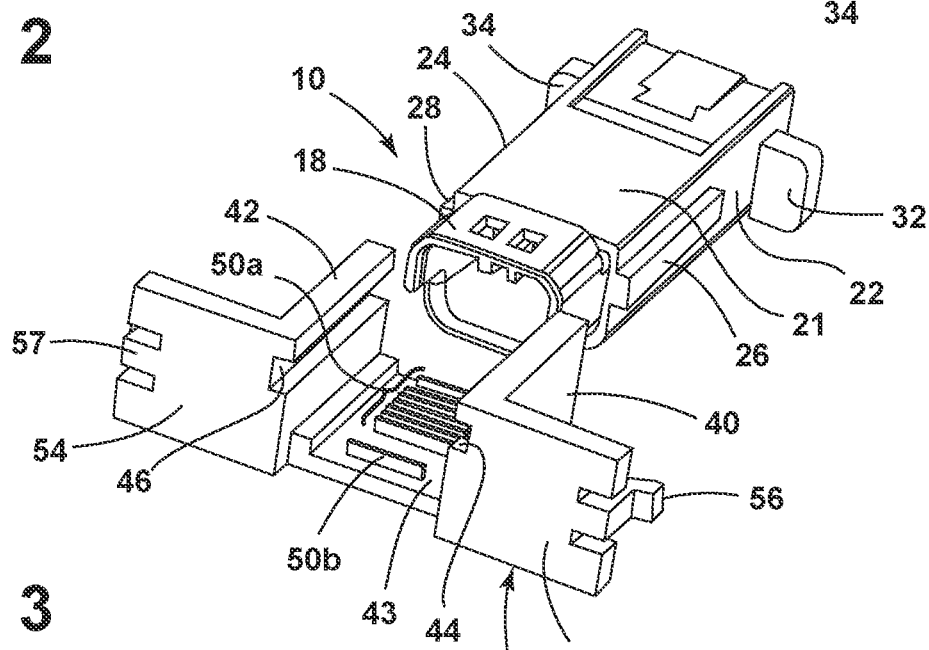
FIG. 3 is another perspective view of the vehicle seat track position sensor of FIG. 1 which depicts the sensor body separated from the sensor bracket.
Figure 4:
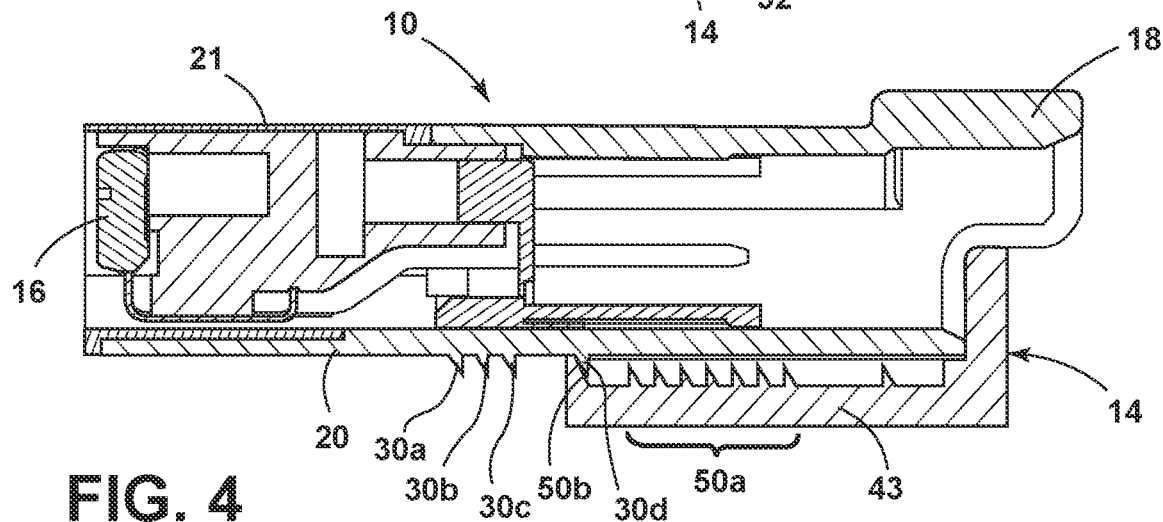
FIG. 4 is a vertical cross-sectional view of the vehicle seat track position sensor assembly of FIG. 1.

FIGS. 1-4 depicts a vehicle seat track position sensor assembly 10 comprising an elongated sensor body or housing 12 seated in and secured to a bracket 14.

A sensor integrated circuit 16 is mounted at a first distal end 17a of the sensor body 12. A terminal receptacle 18 is defined at an opposed second distal end 17b of the sensor body 12.

The sensor body 12 includes a plurality of exterior lower, upper, and side walls or surfaces including opposed lower and upper exterior horizontal walls or surfaces 20 and 21 and a pair of vertical opposed side walls or surfaces 22 and 24.

A pair of elongate, horizontal, and co-linear mounting sensor body rails or guides 26 and 28 protrude outwardly from the pair of vertical side walls or surfaces 22 and 24 respectively. A plurality of spaced apart and parallel flexible teeth or elongated fins or tabs or flaps or ribs 30 protrude outwardly from the lower exterior horizontal wall or surface 20.

In the embodiment shown, three of the teeth 30a, 30b, and 30c are spaced an equal distance from each other while the tooth 30b is spaced a distance away from the three teeth 30a, 30b, and 30c which is greater than the distance between the three teeth 30a, 30b, and 30c.

The sensor body 12 further includes a pair of co-linear flanges or stops 32 and 34 protruding outwardly from the opposed vertical side walls 22 and 24. The flanges 32 and 34 are located adjacent the distal end of the body 12 with the sensor integrated circuit 16.

The bracket 14 includes a pair of central vertical walls 40 and 42 and a bottom horizontal wall 43 extending between the vertical walls 40 and 42 and together defining a central bracket cavity therebetween. The pair of vertical walls 40 and 42 include a pair of elongate recesses or tracks 44 and 46 extending into the respective interior faces thereof. A plurality of flexible spaced-apart, elongate, and parallel teeth, or fins or tabs or flaps or ribs or the like structure 50 adapted for engagement with the respective teeth 30 on the sensor body 12, protrude and extend upwardly away from the interior face of the bottom horizontal wall 43 into the cavity. In the embodiment shown, a plurality of the teeth 50a are spaced an equal distance from each other while another tooth 50b is spaced a distance away from the plurality of teeth 50a which is greater than the distance between the plurality of teeth 50a.

A pair of co-linear and vertical flanges or walls 52 and 54 protrude and extend outwardly from an exterior face of the pair of central vertical walls 40 and 42 respectively.

A pair of flexible seat track locking tabs or fingers 56 and 57 are formed at respective distal ends of the flanges 52 and 54.

In accordance with one embodiment, the sensor body 12 is seated and secured to the bracket 14 in a relationship with the sensor body 12 seated and secured in the interior bracket cavity with the respective sensor body rails 26 and 28 extending into the respective tracks 44 and 46 in the respective bracket vertical walls 40 and 42 and the tooth 30b on the lower exterior horizontal wall 20 of the sensor body 12 located in the space defined between the tooth 50b and the first of the plurality of teeth 50a on the bottom horizontal wall 43 of the bracket 14.

Although the embodiment as shown in the FIGS. include inter-engaging teeth on the respective sensor body 12 and the bracket 14, it is understanding that the embodiment extends to an other suitable structure on the respective sensor body 12 and the bracket 14 for providing an adjustable securement between the sensor body 12 and the bracket 14 including for example teeth on the sensor body 12 adapted for engagement with and in respective recesses defined in the bracket 14.

Figure 5:
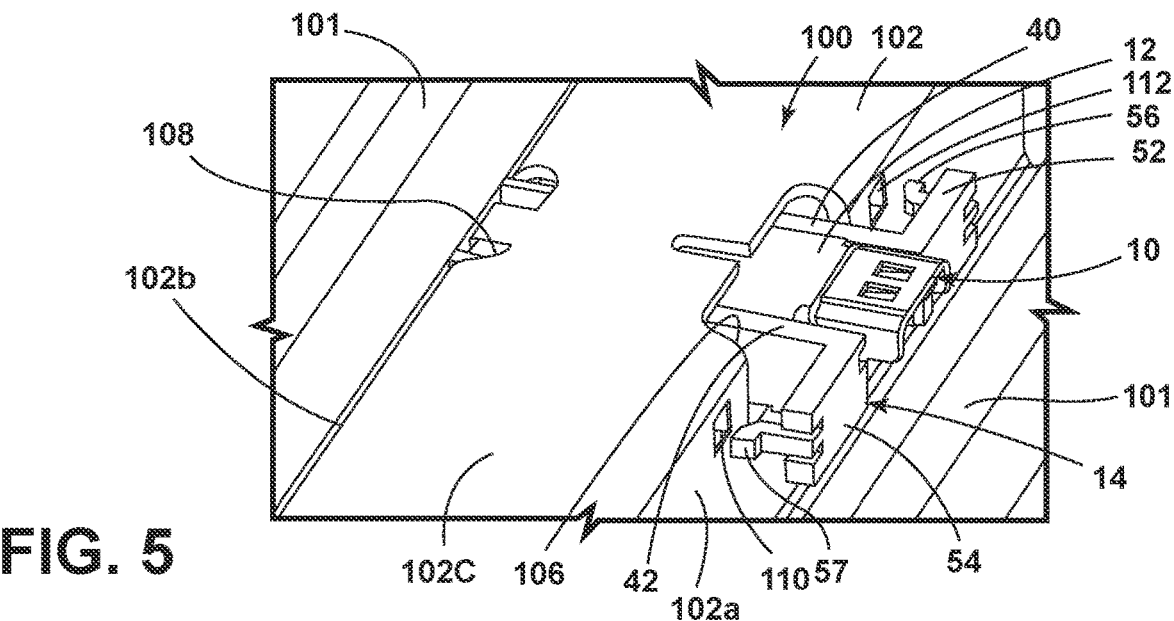
FIG. 5 is a perspective view of the installation of the vehicle seat track position sensor assembly of FIG. 1 into the interior of a vehicle seat track.
Figure 6:
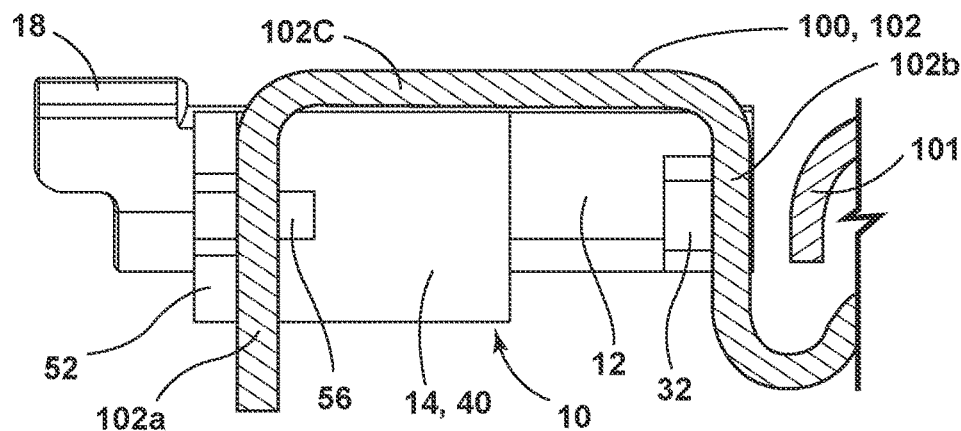
FIG. 6 is a vertical cross-sectional view of the vehicle seat track position sensor assembly of FIG. 1 installed in the interior of the vehicle seat track.
Figure 7:
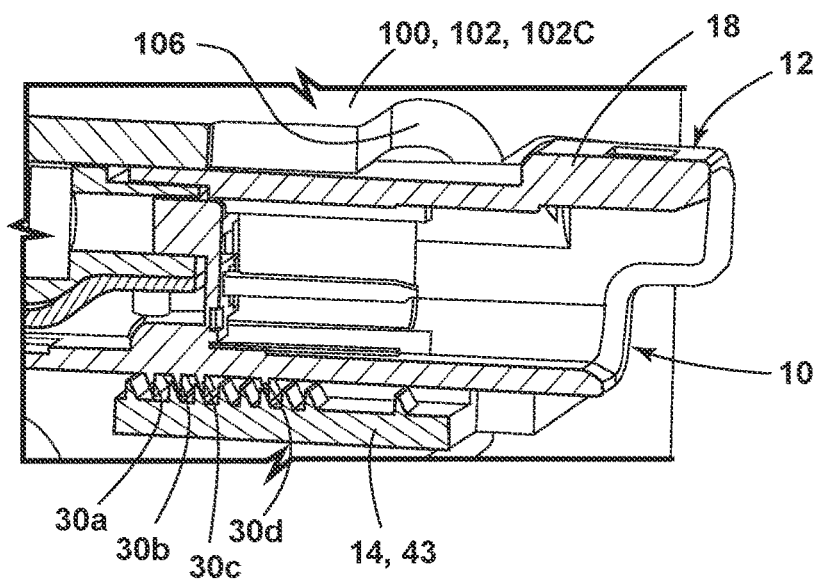
FIG. 7 is a part perspective, part vertical cross-sectional view of the vehicle seat track position sensor assembly of FIG. 1 installed in the interior of the vehicle seat track.
Figure 8:
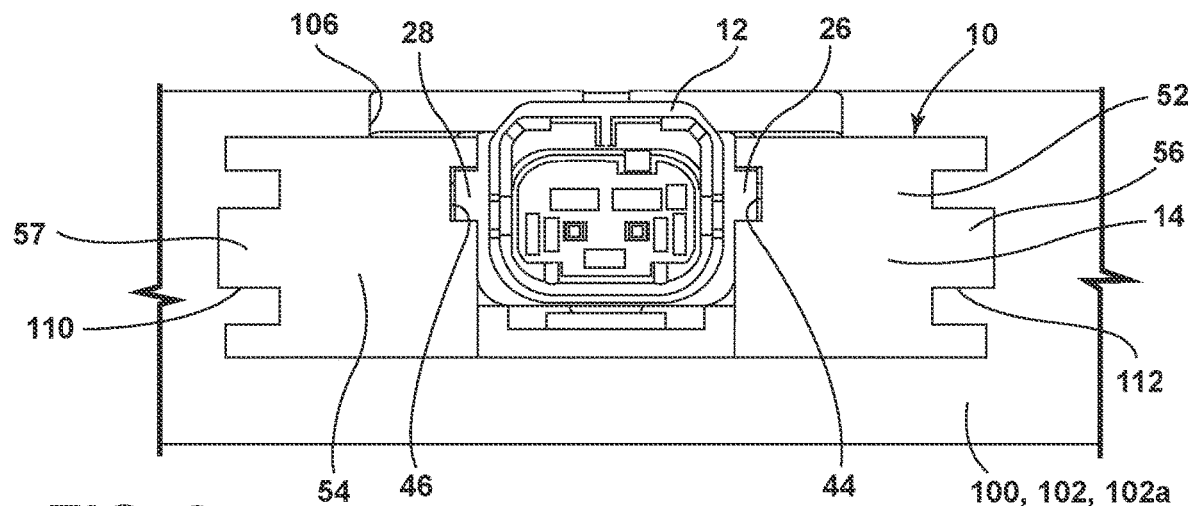
FIG. 8 is a front elevational view of the vehicle seat track position sensor assembly installed in the interior of the vehicle seat track.

The coupling between the sensor body 12 and the bracket 14 represents the as-shipped coupling of the vehicle seat track position sensor assembly 10 prior to installation to and in the moveable vehicle seat track 100 as shown in FIGS. 5-8 which is moveable relative to a stationary and fixed vehicle seat track 101. As shown in FIG. 5, the fixed vehicle seat track 101 on the right side is lower than the fixed vehicle seat track 101 on the opposing side of the elongate moveable vehicle seat track 100.

The elongate moveable vehicle seat track 100 includes an exterior wall 102 defining a front vertical wall section 102a, a back vertical wall section 102b, and a top horizontal wall section 102c together defining an interior cavity or interior track cavity 104. A front opening 106 is defined in the front vertical wall section 102a and a back opening 108 is defined in the back vertical wall section 102b. The respective openings 106 and 108 are in communication with the interior cavity 104. The front vertical wall section 102a further defines a pair of spaced-apart apertures 110 and 112 located in a relationship spaced from, and on opposed sides of, the front opening 106.

Figure 10:
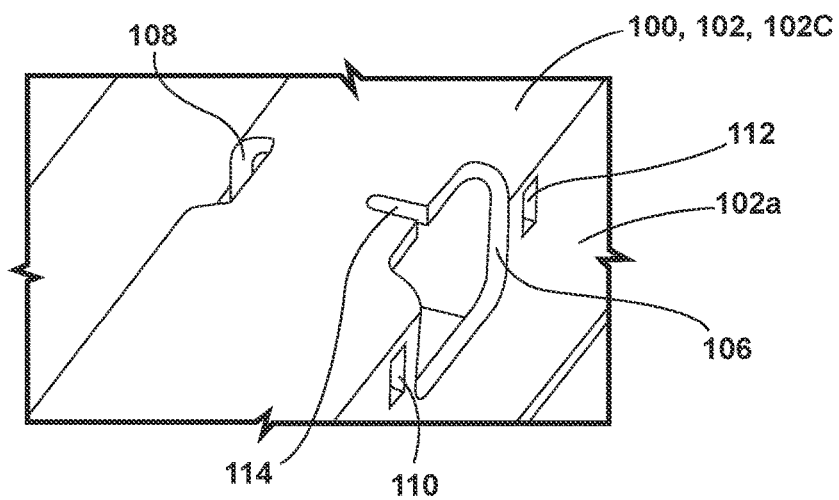
FIG. 10 is a perspective view of an additional embodiment of a seat track structure.

In an additional embodiment as shown in FIG. 10, the top horizontal wall section 102c of the moveable vehicle seat track 100 further defines an elongate slot 114 extending from the front opening 106.

In accordance with one embodiment, the vehicle seat track position sensor assembly 10 is mounted and secured to the moveable vehicle seat track 100 in a relationship with the sensor body 12 and the bracket 14 extending through the track opening 106 and into the interior track cavity 104; the distal end 17a of the sensor body 12 protruding through the bracket opening 108; the respective flanges 32 and 34 of the sensor body 12 abutted against the interior face of the seat track back wall section 102b; the respective tabs 56 and 57 on the respective flanges 52 and 54 of the bracket 14 extending into against the respective apertures 110 and 112 in the front wall section 102a of the seat track 100 and latched against the interior face of the front wall section 102a of the seat track 100; and the respective flanges 52 and 54 of the bracket 14 abutted against the exterior face of the front wall section 102a of the seat track 100 all for locking the vehicle seat track position sensor assembly 10 to the moveable vehicle seat track 100.

Further, in accordance with one embodiment, the sensor body 12 is further slid into the interior cavity 104 of the seat track 100 and the respective teeth 30 on the sensor body 12 are ratcheted or advanced against the respective teeth 50 on the bracket 14. The number of respective teeth 30 and 50 engaged or ratcheted or advanced against each other will be dependent upon the width of the seat track 100 and more specifically dependent upon the distance between the opposed front and back wall sections 102a and 102b of the moveable vehicle seat track 100.

The ratcheting and engagement between the respective teeth 30 and 50 results in a rigid vehicle seat track position sensor assembly 10 regardless of seat track width with no movement of the vehicle seat track position sensor assembly 10. The engagement by two teeth selectively secures the sensor body 12 to the bracket 14 at a position at least partially within the central bracket cavity. The selective engagement provides a size of the vehicle seat track position sensor assembly 10 corresponding to the moveable vehicle seat track 100.

In accordance with one embodiment, the seat track position sensor assembly 10 can be removed from the seat track 100 via the insertion of the tool of a blade into a groove formed between the respective tabs 56 and 57 on the bracket 14 and the respective apertures 110 and 112 in the front wall section 102a of the seat track 100 which will result in the deformation or compression of the respective tabs 56 and 57 and allow for the removal of the sensor assembly 10 from the interior of the seat track 100.

Figure 9:
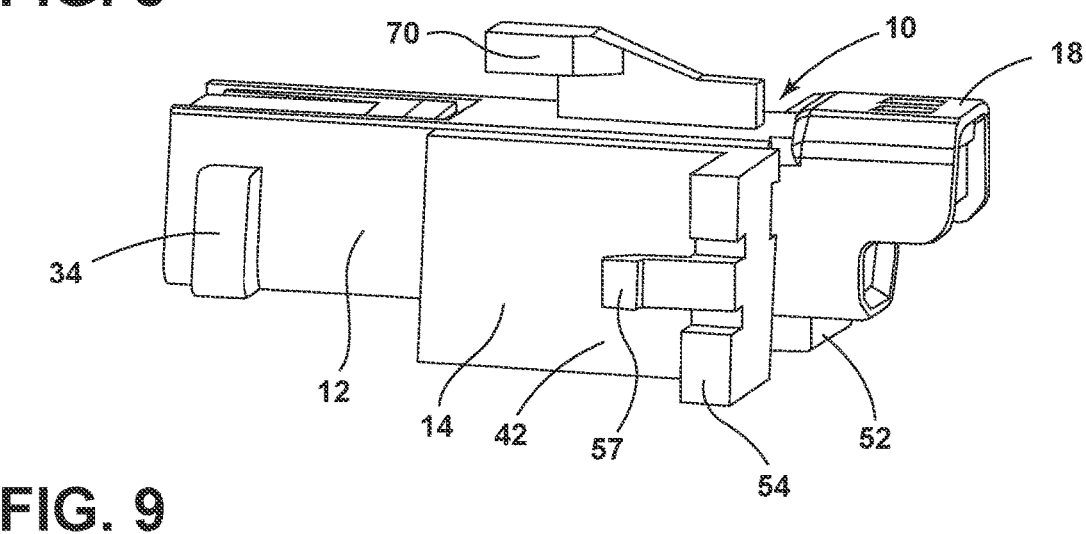
FIG. 9 is a perspective view of an additional embodiment of a vehicle seat track position sensor assembly.

Referring to FIG. 9, the sensor body 12 may further include an elongate fin 70 on a top horizontal wall thereof that is adapted to be slid into the respective slot 114 defined in the top horizontal wall section 102c of the seat track 100 so as to eliminate all z-axis variation or movement of the sensor assembly 10.

Figure 11:
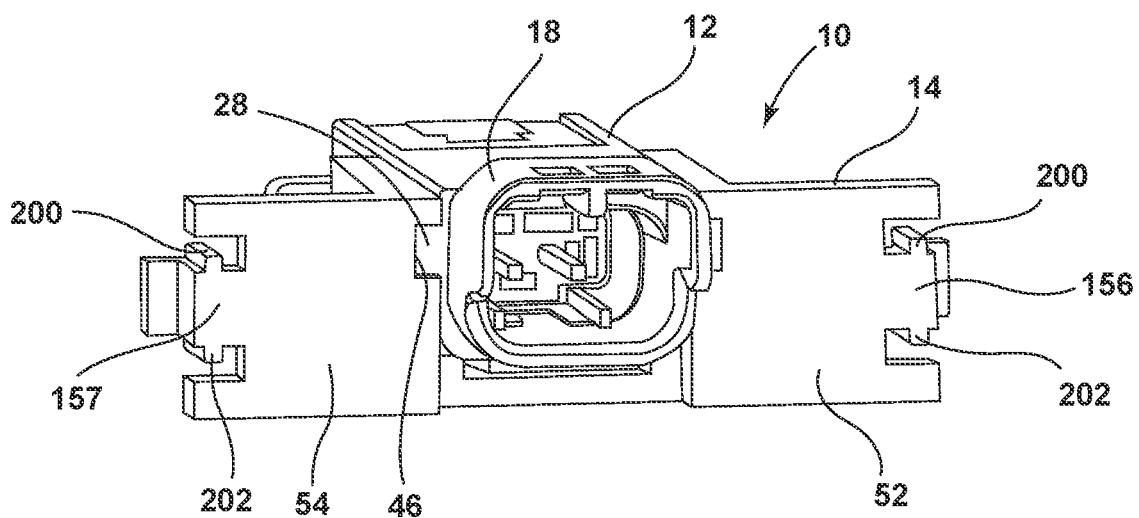
FIG. 11 is a perspective view of yet a further embodiment of a vehicle seat track position sensor assembly.
Figure 12:
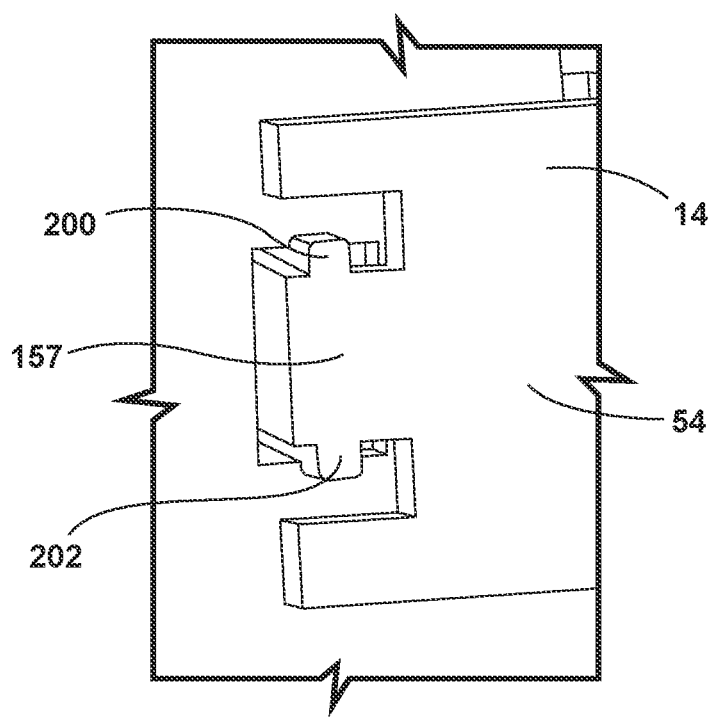
FIG. 12 is an enlarged front elevational view of the further embodiment of the vehicle seat track position sensor assembly of FIG. 11 mounted to a vehicle seat track.

FIGS. 11 and 12 depict an additional embodiment of the bracket 14 of the sensor assembly 10 including respective flanges 52 and 54 with respective tabs 156 and 157 that include respective crush ribs 200 and 202 adapted to be interference fitted within respective apertures 110 and 112 in the front wall section 102a of the seat track 100 for accommodating any z-axis variation between the respective sensor assembly alignment and locking features.

A method of mounting the vehicle seat track position sensor assembly 10 to a moveable vehicle seat rack 100 includes the following steps.

Providing a vehicle seat track position sensor assembly 10 that includes a bracket 14 having a plurality of walls defining an interior cavity and including a plurality of teeth. The bracket 14 includes flanges 52, 54 having respective tabs 56, 57 projecting inwardly therefrom. The vehicle seat track position sensor assembly 10 also includes a sensor body 12 seated in the interior cavity of the bracket 14 that includes another a plurality of teeth 30 adapted for engagement with the plurality of teeth 50 on the bracket 14 for securing the sensor body to the bracket.

The method includes providing a movable vehicle seat track 100 having a front opening 106 and a pair of spaced apertures 110, 112 on opposing sides thereof.

The method also includes inserting a distal end of the vehicle seat track position sensor assembly 10 into the front opening of the movable track seat 100 until the respective tabs 56, 57 projecting from the flanges enter the respective spaced apertures 110, 112 of the movable vehicle seat track for securement thereto.

In one embodiment, the sensor body 12 includes a fin 70 configured for engagement with a slot 114 extending from the front opening in a top horizontal wall section 102c of the movable vehicle seat track 100 for securing the vehicle seat track position sensor assembly 10 to the moveable vehicle seat track 100.

In one embodiment, the method includes securing the sensor body 12 to the bracket 14 by selectively advancing the plurality of teeth 30 on the sensor body 12 relative to and against the teeth 50 of the bracket 14 for locking the vehicle seat track position sensor assembly in the interior cavity of the bracket 14 at a position that corresponds to a distance between opposed front and back wall sections of the vehicle seat track. Thus, by selective choosing from multiple positions, the vehicle seat track position sensor assembly 10 is useable with multiple sized vehicle seat track arrangements.

Numerous variations and modifications of the embodiments of the vehicle seat track position sensor assembly as described above may be effected without departing from the spirit and scope of the novel features as disclosed herein. It is to be understood that no limitations with respect to the embodiment illustrated herein are intended or should be inferred. It is, of course, intended to cover by the appended claims all such modifications as fall within the scope of the claims.

What is claimed is:

1. A vehicle seat track position sensor assembly adapted for mounting to a vehicle seat track, the vehicle seat track position sensor assembly comprising:
   a bracket including a plurality of walls defining an interior cavity and including a plurality of teeth; and
   a sensor body seated in the interior cavity of the bracket and including another plurality of teeth adapted for engagement with the plurality of teeth on the bracket, securing the sensor body to the bracket.

2. The vehicle seat track position sensor assembly of claim 1 wherein the vehicle seat track defines an interior cavity and the vehicle seat track position sensor assembly extends into the interior cavity of the vehicle seat track, the another plurality of teeth on the sensor body being adapted for advancement relative to and against the teeth of the bracket for locking the vehicle seat track position sensor assembly in the interior cavity of the vehicle seat track at a position that corresponds to a distance between opposed front and back wall sections of the seat track.

3. The vehicle seat track position sensor assembly of claim 1, further comprising respective locking tabs on the bracket extending into respective apertures in the vehicle seat track for securing the vehicle seat track position sensor assembly to the vehicle seat track.

4. The vehicle seat track position sensor assembly of claim 1, further comprising respective guide rails on one of the sensor body or the bracket adapted for engagement with respective guide tracks on the other of the sensor body or the bracket for securing the sensor body to the bracket.

5. The vehicle seat track position sensor assembly of claim 1, further comprising respective flanges at opposed distal ends of the sensor body and adapted for engagement with respective walls on the vehicle seat track for positioning and securing the vehicle seat track position sensor assembly in an interior cavity of the vehicle seat track.

6. The vehicle seat track position sensor assembly of claim 3, further comprising crush ribs on the respective locking tabs adapted for engagement with respective apertures on the vehicle seat track.

7. The vehicle seat track position sensor assembly of claim 1, further comprising a fin on the sensor body or the bracket adapted for engagement with a slot in the vehicle seat track for securing the vehicle seat track position sensor assembly to the vehicle seat track.

8. A vehicle seat track position sensor assembly adapted for mounting to a vehicle seat track, the vehicle seat track position sensor assembly comprising:
   a bracket including a pair of central vertical walls and a bottom horizontal wall defining a central bracket cavity and including a plurality of teeth; and
   a sensor body seated in the central bracket cavity of the bracket and including another plurality of teeth configured for selective adjustable engagement with the plurality of teeth on the bracket, selectively securing the sensor body to the bracket at a position at least partially within the central bracket cavity.

9. The vehicle seat track position sensor assembly of claim 8, wherein the vehicle seat track defines an interior cavity and the vehicle seat track position sensor assembly extends into the interior cavity of the vehicle seat track, the another plurality of teeth on the sensor body being configured for advancement relative to and against the teeth of the bracket for locking the vehicle seat track position sensor assembly in the interior cavity of the vehicle seat track at a position that corresponds to a distance between opposed front and back wall sections of the seat track.

10. The vehicle seat track position sensor assembly of claim 8, further comprising respective locking tabs on the bracket extending into respective apertures in the vehicle seat track for securing the vehicle seat track position sensor assembly to the vehicle seat track.

11. The vehicle seat track position sensor assembly of claim 10, further comprising crush ribs on the respective locking tabs configured to be interference fitted within respective apertures in a front wall section of the vehicle seat track.

12. The vehicle seat track position sensor assembly of claim 8, further comprising respective guide rails on one of the sensor body or the bracket configured for engagement with respective guide tracks on the other of the sensor body or the bracket for securing the sensor body to the bracket.

13. The vehicle seat track position sensor assembly of claim 12, further comprising respective flanges at opposed distal ends of the sensor body and configured for engagement with respective walls on the vehicle seat track for positioning and securing the vehicle seat track position sensor assembly in an interior cavity of the vehicle seat track.

14. The vehicle seat track position sensor assembly of claim 13, further comprising a fin on the sensor body configured for engagement with a slot in the vehicle seat track for securing the vehicle seat track position sensor assembly to the vehicle seat track.

15. The vehicle seat track position sensor assembly of claim 8, further comprising respective flanges at opposed distal ends of the sensor body and configured for engagement with respective walls on the vehicle seat track for positioning and securing the vehicle seat track position sensor assembly in an interior cavity of the vehicle seat track.

16. The vehicle seat track position sensor assembly of claim 8, further comprising a fin on the sensor body configured for engagement with a slot in the vehicle seat track for securing the vehicle seat track position sensor assembly to the vehicle seat track.

17. A method of mounting a vehicle seat track position sensor assembly to a vehicle seat track, the method comprising:
  providing the vehicle seat track position sensor assembly adapted for mounting to a vehicle seat track, the vehicle seat track position sensor assembly including:
    a bracket including a plurality of walls defining a central bracket cavity with a plurality of teeth projecting into the central bracket cavity, the bracket including flanges having respective tabs projecting inwardly therefrom; and
    a sensor body seated in the central bracket cavity of the bracket and including another plurality of teeth adapted for engagement with the plurality of teeth on the bracket for securing the sensor body to the bracket;
  providing a movable vehicle seat track having a front opening and a pair of spaced apertures on opposing sides thereof; and
  inserting a distal end of the vehicle seat track position sensor assembly into the front opening of the movable vehicle seat track until the respective tabs projecting from the flanges enter the spaced apertures of the movable vehicle seat track, securing the sensor body to the bracket.

18. The method of claim 17, wherein the sensor body includes a fin configured for engagement with a slot extending from the front opening in a top horizontal wall section of the movable vehicle seat track for securing the vehicle seat track position sensor assembly to the moveable vehicle seat track.

19. The method of claim 17, including securing the sensor body to the bracket by selectively advancing the another plurality of teeth on the sensor body relative to and against the teeth of the bracket for locking the vehicle seat track position sensor assembly in the central bracket cavity of the bracket at a position that corresponds to a distance between opposed front and back wall sections of the vehicle seat track.

* * * * *